(12) United States Patent
Kumar et al.

(10) Patent No.: US 8,467,611 B2
(45) Date of Patent: Jun. 18, 2013

(54) VIDEO KEY-FRAME EXTRACTION USING BI-LEVEL SPARSITY

(75) Inventors: Mrityunjay Kumar, Rochester, NY (US); Zheshen Wang, Tempe, AZ (US); Jiebo Luo, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 377 days.

(21) Appl. No.: 12/964,784

(22) Filed: Dec. 10, 2010

(65) Prior Publication Data

US 2012/0148157 A1 Jun. 14, 2012

(51) Int. Cl.
*G06K 9/46* (2006.01)

(52) U.S. Cl.
USPC ...................................................... 382/195

(58) Field of Classification Search
None
See application file for complete search history.

(56) References Cited

U.S. PATENT DOCUMENTS 7,110,458 B2 9/2006 Divakaran et al.

OTHER PUBLICATIONS

Dong, Zilong, et al. "Keyframe-based real-time camera tracking." Computer Vision, 2009 IEEE 12th International Conference on. IEEE, 2009.*

Omidyeganeh M et al: Autoregressive Video Modeling through 2D Wavelet Statistics:, Intelligent Information Hiding and Multimedia Signal Processing (IIH-MSP), 2010 Sixth International Conference on, IEEE, Piscataway, NJ, USA, Oct. 15, 2010, pp. 272-275, XP031803555, ISBN: 978-1-4244-8378-5; abstract; section I, paragraph 1; section II, paragraph 2; section III—section V.B., paragraph 1; figures 2,5.

Uchihashi et al., "Summarizing video using a shot importance measure and a frame-packing algorithm," IEEE International Conference on Acoustics, Speech and Signal Processing, pp. 3041-3044 (1999).

Uchihashi et al., "Video manga: generating semantically meaningful video summaries," Proc. 7th ACM International Conference on Multimedia, pp. 383-392 (1999).

Zhang et al., "An integrated system for content-based video retrieval and browsing," Pattern Recognition, pp. 643-658 (1997).

Arman et al., "Content-based browsing of video sequences," Proc. 2nd ACM International Conference on Multimedia, pp. 97-103 (1994).

Wang et al., "Video summarization by redundancy removing and content ranking," Proc. 15th International Conference on Multimedia, pp. 577-580 (2007).

(Continued)

*Primary Examiner* — Stephen R Koziol
*Assistant Examiner* — Raphael Schwartz
(74) *Attorney, Agent, or Firm* — Kevin E. Spaulding (57) ABSTRACT

A method for identifying a set of key frames from a video sequence including a time sequence of video frames, the method executed at least in part by a data processor, comprising: selecting a set of video frames from the video sequence; identifying a plurality of visually homogeneous regions from each of the selected video frames; defining a set of basis functions, wherein each basis function is associated with a different visually homogeneous region; determining a feature vector for each of the selected video frames; representing each of the determined feature vectors as a sparse combination of the basis functions; for each of the determined feature vectors, determining a sparse set of video frames that contain the visually homogeneous regions corresponding to the basis functions included in the corresponding sparse combination of the basis functions; and analyzing the sparse sets of video frames to identify the set of key frames.

19 Claims, 7 Drawing Sheets

OTHER PUBLICATIONS

Rasheed et al., "Detection and representation of scenes in videos," IEEE Multimedia, pp. 1097-1105 (2005).

Girgensohn et al., "Time-constrained keyframe selection technique," IEEE International Conference on Multimedia Computing Systems, pp. 756-761 (1999).

Doulamis et al., "A fuzzy video content representation for video summarization and content-based retrieval," Signal Processing, pp. 1049-1067 (2000).

Xiao et al., "SUN Database: Large-scale scene recognition from abbey to zoo," IEEE Conference on Computer Vision and Pattern Recognition, pp. 3485-3492 (2010).

Bruckstein et al., "From sparse solutions of systems of equations to sparse modeling of signals and images," SIAM Review, pp. 34-81, (2009).

Kim et al., "An interior-point method for large-scale $\ell_1$-regularized least squares," IEEE Journal of Selected Topics in Signal Processing, pp. 606-617 (2007).

Romdhani et al., "Computationally efficient face detection" Proc. $8^{th}$ International Conference on Computer Vision, pp. 695-700 (2001).

Liu et al., "Noise estimation from a single image," IEEE Conference on Computer Vision and Pattern Recognition, pp. 901-908 (2006).

Ferzli et al., "A no-reference objective image sharpness metric based on just-noticeable blur and probability summation," IEEE International Conference on Image Processing, vol. III, pp. 445-448 (2007).

Brin et al., "The anatomy of a large-scale hypertextual web search engine," Proc. International Conference on World Wide Web, pp. 107-117 (1998).

von Luxburg, "A tutorial on spectral clustering," Journal of Statistics and Computing, vol. 17, pp. 395-416 (2007).

\* cited by examiner

VIDEO KEY-FRAME EXTRACTION USING BI-LEVEL SPARSITY

CROSS-REFERENCE TO RELATED APPLICATIONS

Reference is made to commonly assigned, co-pending U.S. patent application Ser. No. 12/908,022, entitled: "Video summarization using sparse basis function combination", by Kumar et al., and to commonly assigned, co-pending U.S. patent application Ser. No. 12/964,778, entitled: "Video key frame extraction using sparse representation", by Kumar et al., both of which are incorporated herein by reference.

FIELD OF THE INVENTION

This invention relates generally to the field of video understanding, and more particularly to a method to extract key frames from digital video using a sparse signal representation.

BACKGROUND OF THE INVENTION

Video key-frame extraction algorithms select a subset of the most representative frames from an original video. Key-frame extraction finds applications in several broad areas of video processing research such as video summarization, creating "chapter titles" in DVDs, and producing "video action prints."

Video key-frame extraction is an active research area, and many approaches for extracting key frames from the original video have been proposed. Conventional key-frame extraction approaches can be loosely divided into two groups: (i) shot-based, and (ii) segment-based. In shot-based video key-frame extraction, the shots of the original video are first detected, and then one or more key frames are extracted for each shot. For example, Uchihashi et al., in the article "Summarizing video using a shot importance measure and a frame-packing algorithm" (IEEE International Conference on Acoustics, Speech and Signal Processing, pp. 3041-3044, 1999) teach segmenting a video into its component shots. Unimportant shots are then discarded using a measure of shot importance. The key-frames are generated for each of the remaining important shots.

Another method taught by Zhang et al. in the article "An integrated system for content-based video retrieval and browsing" (Pattern Recognition, pp. 643-658, 1997) segments a video into shots and determines key frames for each shot based on feature and content information.

Arman et al., in the article "Content-based browsing of video sequences" (Proc. 2nd ACM International Conference on Multimedia, pp. 97-103, 1994) teach using video shots as the basic building blocks. After shot detection, the tenth frame of each shot is selected as the key frame.

Another method taught by Wang et al., in the article "Video summarization by redundancy removing and content ranking" (Proc. 15th International Conference on Multimedia, pp. 577-580, 2007), detects shot boundaries by color histogram and optical-flow motion features, and extracts key frames in each shot by a leader-follower clustering algorithm. A video summary is then generated by key frame clustering and repetitive segment detection.

In segment-based video key-frame extraction approaches, a video is segmented into higher-level video components, where each segment or component could be a scene, an event, a set of one or more shots, or even the entire video sequence. Representative frame(s) from each segment are then selected as the key frames.

In U.S. Pat. No. 7,110,458, entitled "Method for summarizing a video using motion descriptors", Divakaran et al. teach a method for forming a video summary that measures an intensity of motion activity in a compressed video and uses the intensity information to partition the video into segments. Key frames are then selected from each segment. The selected key frames are concatenated in temporal order to form a summary of the video.

Uchihashi et al., in the article "Video manga: generating semantically meaningful video summaries" (Proc. 7th ACM International Conference on Multimedia, pp. 383-392, 1999) use a tree-structured representation to cluster all the frames of the video into a predefined number of clusters. This information is then exploited to segment the video. The relevant key frames for each segment are selected based on the relative importance of video segments.

Rasheed et al., in the article "Detection and representation of scenes in videos" (IEEE Multimedia, pp. 1097-1105, 2005) construct a weighted undirected graph called a "shot similarity graph" (SSG) for clustering shots into scenes. The content of each scene is described by selecting one representative frame from the corresponding scene as a scene key-frame.

Girgensohn et al., in the article "Time-constrained key-frame selection technique" (IEEE International Conference on Multimedia Computing Systems, pp. 756-761, 1999) use a hierarchical clustering algorithm to cluster similar frames. Key frames are extracted by selecting one frame from each cluster.

Another method taught by Doulamis et al., in the article "A fuzzy video content representation for video summarization and content-based retrieval" (Signal Processing, pp. 1049-1067, 2000) extracts key frames by minimizing a cross correlation criterion among the video frames by means of a genetic algorithm. The correlation is computed using several features extracted using color/motion segmentation on a fuzzy feature vector formulation basis.

All of the above methods rely on the accuracies of the feature selection and clustering algorithms used for shot detection and video segmentation. Furthermore, these approaches are vulnerable to noise, and are not very data adaptive. Thus, there exists a need for video key-frame extraction framework that is data adaptive, robust to noise, and less sensitive to feature selection.

SUMMARY OF THE INVENTION

The present invention represents a method for identifying a set of key frames from a video sequence including a time sequence of video frames, the method executed at least in part by a data processor, comprising:

a) selecting a set of video frames from the video sequence;

b) identifying a plurality of visually homogeneous regions from each of the selected video frames;

c) defining a set of basis functions, wherein each basis function is associated with a different visually homogeneous region;

d) determining a feature vector for each of the selected video frames;

e) representing each of the determined feature vectors as a sparse combination of the basis functions;

f) for each of the determined feature vectors, determining a sparse set of video frames that contain the visually homogeneous regions corresponding to the basis functions included in the corresponding sparse combination of the basis functions; and g) analyzing the sparse sets of video frames to identify the set of key frames.

The present invention has the advantage that the key frames are identified using a sparse-representation-based framework, which is data-adaptive, and robust to measurement noise.

The present invention also has the advantage that it exploits both the local spatial information and the temporal information of the input video frames to identify the key frames.

It has the additional advantage that it can incorporate low-level video image quality information such as blur, noise and sharpness, as well as high-level semantics information such as face detection, motion detections and semantic classifiers.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting.

The phrase, "digital content record", as used herein, refers to any digital content record, such as a digital still image, a digital audio file, or a digital video file.

It should be noted that, unless otherwise explicitly noted or required by context, the word "or" is used in this disclosure in a non-exclusive sense.

Figure 1:
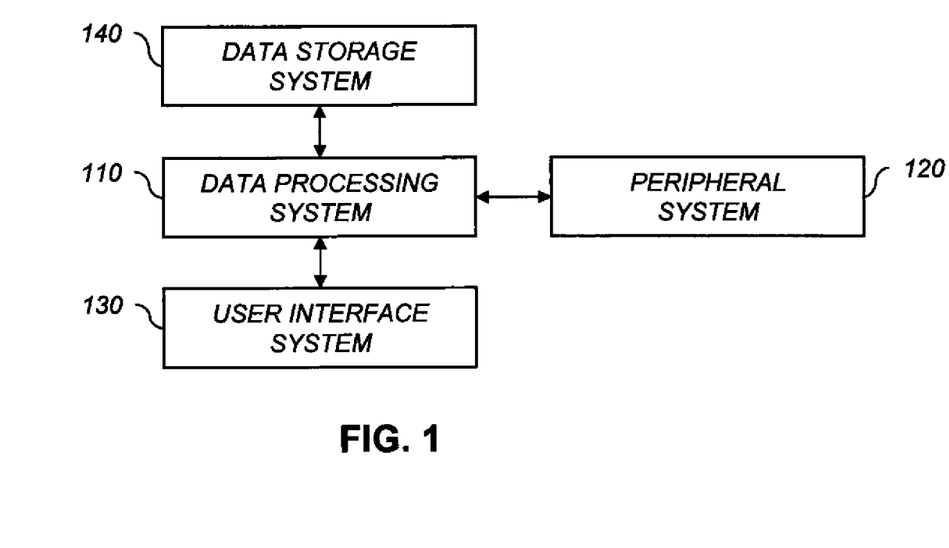
FIG. 1 is a high-level diagram showing the components of a system for summarizing digital video according to an embodiment of the present invention.

FIG. 1 is a high-level diagram showing the components of a system for identifying a set of key frames from a video sequence according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes of FIGS. 2-7 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes of FIGS. 2-7 described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated.

The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
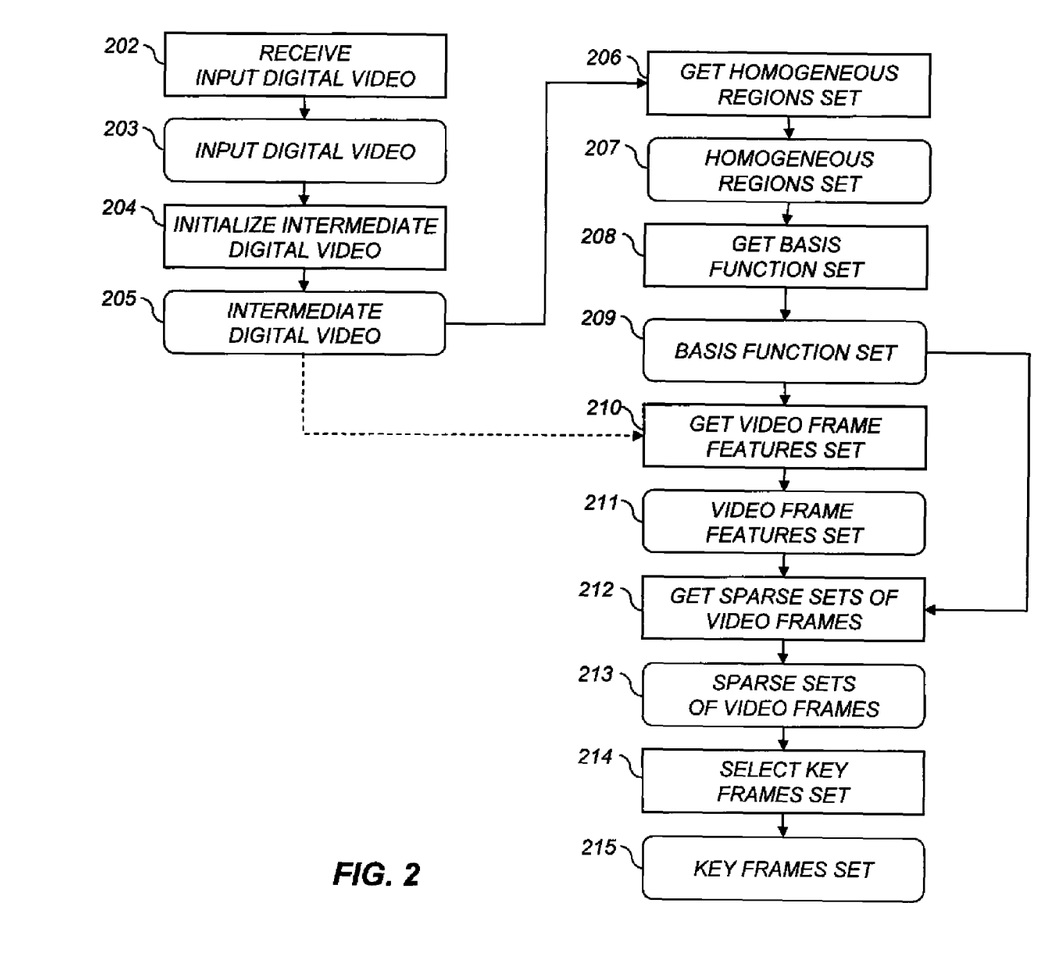
FIG. 2 is a flow diagram illustrating a method for identifying a set of key frames from a digital video according to an embodiment of the present invention.

FIG. 2 is a flow diagram illustrating a method for identifying a set of key frames from a video sequence according to an embodiment of the present invention. An input digital video 203 representing a video sequence captured of a scene is received in a receive input digital video step 202. The video sequence includes a time sequence of video frames. The input digital video 203 can be captured using any video capture device known in the art such as a video camera or a digital still camera with a video capture mode, and can be received in any digital video format known in the art.

An initialize intermediate digital video step 204 is used to initialize an intermediate digital video 205. The intermediate digital video 205 is a modified video determined from the input digital video 203.

A get homogeneous regions set step 206 produces a homogeneous regions set 207 by identifying a plurality of visually homogeneous regions from each of the video frames of the intermediate digital video 205.

A get basis function set step 208 determines a set of basis functions responsive to the homogeneous regions set 207, wherein each basis function is associated with a different visually homogeneous region stored in the homogeneous regions set 207. The set of basis functions determined in the get basis function set step 208 is stored in a basis function set 209.

A get video frame features set step 210 determines a video frame features set 211 responsive to the basis function set 209, wherein the containing video frame features set 211 contains feature vectors for each of the video frames of the intermediate digital video 205. The get video frame features set step 210 is optionally responsive to the intermediate digital video 205. (Note that optional features are represented with dashed lines.)

A get sparse sets of video frames step 212 uses the basis function set 209 and the video frame features set 211 to produce sparse sets of video frames 213. Finally, a select key frames set step 214 analyzes the sparse sets of video frames 213 to produce a key frames set 215 that contains the key frames for the input digital video 203.

The individual steps outlined in FIG. 2 will now be described in greater detail. The initialize intermediate digital video step 204 is a preprocessing step that preprocesses the input digital video 203 to produce the intermediate digital video 205. The intermediate digital video 205 is more suitable for the subsequent steps carried out to produce the key frames set 215. The intermediate digital video 205 can be generated using any appropriate method known to those skilled in the art. In one embodiment, the intermediate digital video 205 contains all of the frames in the input digital video 203. In a preferred embodiment of the present invention, the intermediate digital video 205 is a subset of the video frames of the input digital video 203 produced by down-sampling each frame of the input digital video 203 by a factor of 2× in both the horizontal and vertical directions and only retaining every 5$^{th}$ frame of the input digital video 203. It will be obvious to one skilled in the art that different spatial and temporal down-sampling rates can be applied in accordance with the present invention. Additionally, other types of processing steps such as color adjustment, sharpening and noise removal can also be included in the initialize intermediate digital video step 204.

The get homogeneous regions set step 206 identifies a plurality of visually homogeneous regions from each of the video frames of the intermediate digital video 205. The get homogeneous regions set step 206 can use any method known to those skilled in the art to determine homogeneous regions from the video frames of the intermediate digital video 205. In a preferred embodiment of the present invention, the homogeneous regions are extracted using an image segmentation algorithm. The goal of image segmentation algorithms is to identify visually homogeneous regions of the input image and several such image segmentation algorithms have been proposed in the literature. In a preferred embodiment, an image segmentation algorithm proposed by Felzenszwalb et al. in the article "Efficient Graph-Based Image Segmentation" (International Journal of Computer Vision, pp. 167-181, 2004) is applied to each of the frames of the intermediate digital video 205 and the homogeneous regions generated by the image segmentation algorithm are stored in the homogeneous regions set 207.

The get basis function set step 208 determines a set of basis functions, wherein each basis function is associated with a different visually homogeneous region in the homogeneous regions set 207. The set of basis functions determined at the get basis function set step 208 is collected in the basis function set 209. The get basis function set step 208 can use any method known to those skilled in the art to determine the set of basis functions. In a preferred embodiment of the present invention, each basis function is a visual feature vector extracted at the get basis function set step 208 for the corresponding visually homogeneous region in the homogeneous regions set 207. Each visual feature vector contains parameters related to the corresponding homogeneous region attributes such as color, texture, and edge orientation present in the homogeneous region. In a preferred embodiment, visual feature vectors are determined using the method described by Xiao et al. in "SUN Database: Large-scale scene recognition from abbey to zoo" (IEEE Conference on Computer Vision and Pattern Recognition, pp. 3485-3492, 2010). These feature vectors include parameters related to the following visual features: a color histogram, a histogram of oriented edges, GIST features, and dense SIFT features.

The get video frame features set step 210 uses the basis function set 209 to determine a feature vector for each of the video frames of the intermediate digital video 205. The feature vectors determined at the get video frame features set step 210 are collected in the video frame features set 211. The get video frame features set step 210 can use any method known to those skilled in the art to produce the video frame features set 211. In a preferred embodiment of the present invention, the feature vector for a particular selected video frame in the intermediate digital video 205 is determined by combining the feature vectors determined for the visually homogeneous regions in the particular selected video frame of the intermediate digital video 205. Let N be the total number of frames in the intermediate digital video 205. In equation form, the feature vector for the i$^{th}$ video frame ($1 \leq i \leq N$) can be expressed as:

$$y_i = f_{i,1} + f_{i,2} + \ldots + f_{i,n_i} \qquad (1)$$

where $y_i$ is the value of the feature vector for the i$^{th}$ video frame in the intermediate digital video 205, $f_{i,j}$ ($1 \leq j \leq n_i$) is the value of the feature vector extracted from the j$^{th}$ homogeneous region of the i$^{th}$ video frame stored in the basis function set 209, and $n_i$ is the total number of the homogeneous regions determined at the get homogeneous regions set step 206 for the i$^{th}$ frame of the intermediate digital video 205. All the feature vectors $y_i$ ($1 \leq i \leq N$) are stored in the video frame features set 211.

In another embodiment, the get video frame features set step 210 extracts a visual feature vector for each frame of the intermediate digital video 205. Each visual features vector contains parameters related to video frame attributes such as color, texture, edge orientation present in a frame. Example of particular visual features that can be used in accordance with the present invention include: color histograms, histograms of oriented edges, GIST features, and dense SIFT features as described in the aforementioned article by Xiao et al. Feature vectors of the frames of the intermediate digital video 205 computed this way are stored in the video frame features set 211. In another embodiment, a feature vector for each frame of the intermediate digital video 205 is determined by applying a set of filters to the corresponding frame. Examples of sets of filters that can be used for this purpose include wavelet filters, Gabor filters, DCT filters, and Fourier filters.

Figure 3:
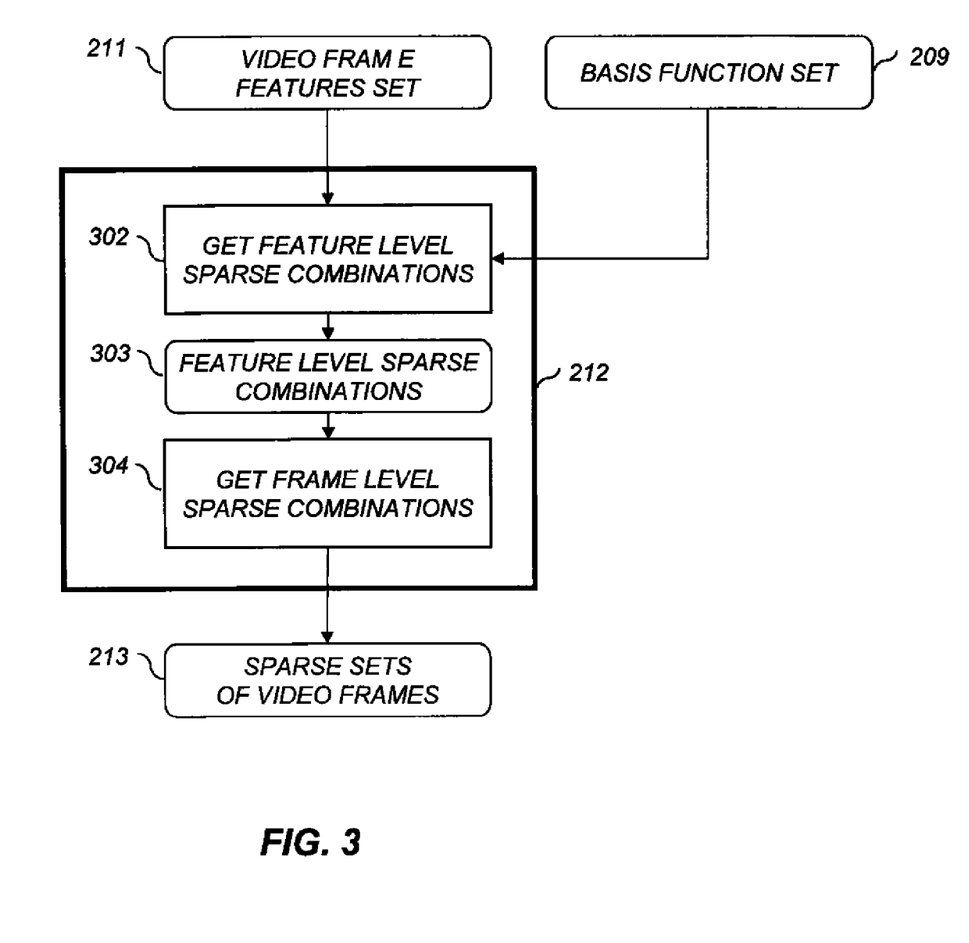
FIG. 3 is a block diagram showing a detailed view of the get sparse sets of video frames step of FIG. 2.

The get sparse sets of video frames step 212 uses the basis function set 209 and the video frame features set 211 to produce the sparse sets of video frames 213. FIG. 3 is a more detailed view of the get sparse sets of video frames step 212 according to a preferred embodiment of the present invention. A get feature level sparse combinations step 302 uses the basis function set 209 and the video frame features set 211 to define a set of feature level sparse combinations 303, which represents each of the frame feature vectors in the video frame features set 211 as a sparse combination of the basis functions in the basis function set 209. The feature level sparse combinations 303 can be defined in any appropriate method known to those skilled in the art. In a preferred embodiment of the present invention, the feature level sparse combinations 303 are defined using a first matrix equation:

$$y = A\alpha \quad (2)$$

where y is the value of the feature vector for a particular frame of the intermediate digital video 205 stored in the video frame features set 211, and A is a matrix formed using the set of basis functions in the basis function set 209. In a preferred embodiment of the present invention, A is formed by stacking all the basis functions in the basis function set 209 as columns. $\alpha$ is a sparse vector of weighting coefficients for the basis functions arranged as columns of matrix A.

The sparse combinations of the basis functions in the basis function set 209 are determined by solving Eq. (2) for $\alpha$ using a sparse solver for each of the feature vectors in the video frame features set 211. The determination of $\alpha$ is discussed in more detail later.

For each of the feature vectors in the video frame features set 211, a get frame level sparse combinations step 304 uses the feature level sparse combinations 303 to determine a sparse set of video frames that contain the visually homogeneous regions corresponding to the basis function in the basis function set 209 included in the corresponding sparse combinations for the basis functions determined by solving Eq. (2). Note that both a feature level sparse combination and a frame level sparse combination are used in the present invention, therefore a main characteristic of the present invention is such bi-level sparsity. In a preferred embodiment of the present invention, the get frame level sparse combinations step 304 determines the sparse set of video frames that contain the visually homogeneous regions by using a sparse solver to solve a second matrix equation:

$$\gamma = B\alpha \quad (3)$$

where B is a transformation matrix that relates the visually homogeneous regions to their corresponding video frames, and $\gamma$ is a sparse vector identifying the sparse set of video frames. The construction of the transformation matrix B and the estimation of $\alpha$, and $\gamma$ are explained next.

The transformation matrix B is an auxiliary variable that relates the sparse combinations of the basis functions ($\alpha$) and the corresponding sparse set of video frames ($\gamma$). In a preferred embodiment of the present invention, the transformation matrix B is formed using the following equation:

$$B = \begin{bmatrix} \beta_{1,1} & \cdots & \beta_{1,n_1} & \cdots & 0 & \cdots & 0 \\ 0 & \cdots & 0 & \cdots & 0 & \cdots & 0 \\ \vdots & & \vdots & & \vdots & & \vdots \\ 0 & \cdots & 0 & \cdots & \beta_{N,1} & \cdots & \beta_{N,n_N} \end{bmatrix} \quad (4)$$

where $\beta_{i,j}$ is the size (number of pixels) of the $j^{th}$ homogeneous region extracted from the $i^{th}$ video frame of the intermediate digital video 205, $1 \leq i \leq N$, $1 \leq j \leq n_i$, N is the total number of video frames in the intermediate digital video 205, and $n_i$ is the total number of homogeneous regions extracted from the $i^{th}$ video frame of the intermediate digital video 205.

Intuitively, similar homogeneous regions derived from the temporally adjacent frames of the intermediate digital video 205 should have similar contributions in determining $\gamma$. This requires imposing a temporal constraint on the homogeneous regions in the homogeneous regions set 207 and can be performed in any method known to those skilled in the art. In one embodiment, the temporal constraint imposed on the homogeneous regions in the homogeneous regions set 207 is incorporated through the transformation matrix B according to the following equation:

$$B^{Temp} = B * h \quad (5)$$

where $B^{Temp}$ is the transformation matrix with temporal constraints that is used in place of B in Eq. (3), "*" denotes 1-dimensional (column-wise) convolution operation, and h is a one dimensional smoothing kernel, which is applied on each column of the matrix B. An example of h is a Gaussian kernel whose width is selected as a function of the degree of the temporal smoothness required.

Returning to the first and second matrix equations, in some embodiments $\alpha$ and $\gamma$ can be estimated by solving Eqs. (2) and (3) independently using any sparse solver known to those skilled in the art. In a preferred embodiment of the present invention, $\alpha$ and $\gamma$ are determined by simultaneously solving the first and second matrix equations as given by Eq. (6) below:

$$[\alpha^*, \gamma^*] = \operatorname*{argmin}_{\alpha, \gamma} \lambda \|\alpha\|_1 + \omega \|\gamma\|_1 \quad (6)$$

$$\text{such that } y = A\alpha, \gamma = B\alpha$$

where $\alpha^*$ and $\gamma^*$ are the estimated values of $\alpha$ and $\gamma$, respectively, $\|\bullet\|_1$ denotes $l_1$-norm, $\lambda$ (>0), and $\omega$ (>0) are regularization parameters that control the sparsity of $\alpha$, and $\gamma$, respectively.

Minimizing $l_1$-norm in Eq. (6) enforces sparsity on $\alpha$, and $\gamma$, (i.e., only few coefficients in $\alpha$, and $\gamma$ are non-zero). Eq. (6) is a well-known optimization problem and can be solved using any method known to those skilled in the art. A particular sparse solver framework that can be used to solve Eq. (6) is described by Liu et al. in the article "Label to region by bi-layer sparsity priors" (ACM Multimedia, pp. 115-124, 2009), which is incorporated herein by reference.

Eq. (6) is solved for each feature vector in the video frame features set 211, and all the $\gamma$ vectors are stored in the sparse sets of video frames 213. As mentioned above, $\lambda$ and $\omega$ control the sparsity of α and γ, respectively. Preferably, λ is chosen such that each sparse combination of the basis functions, represented by the corresponding α, includes no more than 10% of the basis functions. Similarly, ω is chosen such that each sparse set of video frames, represented by the corresponding γ, include no more than 10% of the video frames. In other words, λ and ω control the bi-level sparsity.

While solving Eq. (6) for a particular y, the non-zero coefficients of α may show strong preferences for the columns of A derived from the frame corresponding to y due to the strong correlation between y and the corresponding columns of A. Therefore, to remove this effect, values of α corresponding to such columns are always set to zero for a particular y. Note that the non-zero values of γ indicate the dependency of the video frame corresponding to the feature vector y and the video frames corresponding to the columns of the matrix A selected by the non-zero values of α. Therefore, each γ can be modified to preferentially select video frames of the intermediate digital video 205 that are temporally near to the video frame corresponding to the particular determined feature vector y. This could be done by setting those non-zero coefficients of γ to zero that correspond to the frames of the intermediate digital video 205 that are temporally far apart from the frame of the intermediate digital video 205 corresponding to the particular determined feature vector y.

Figure 4:
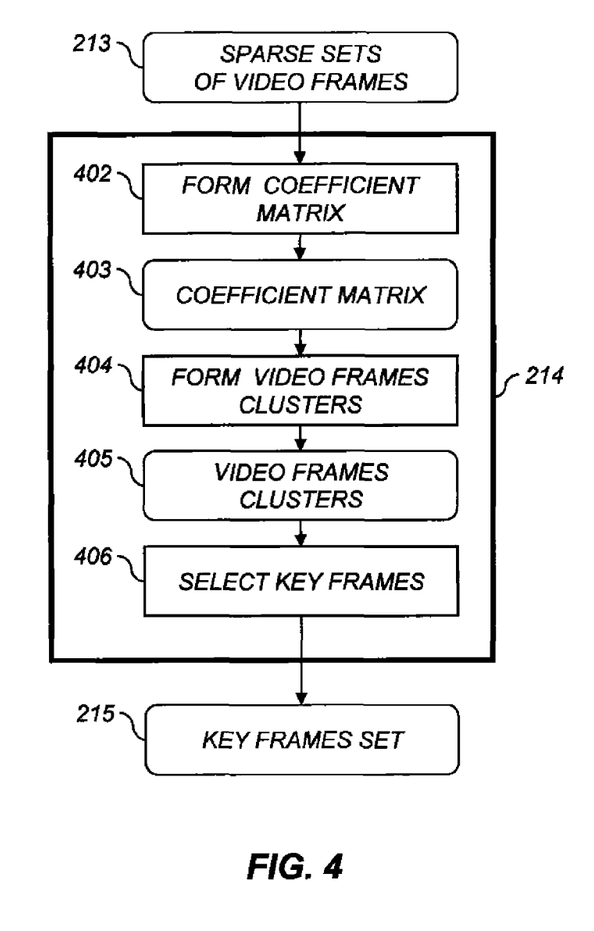
FIG. 4 is a block diagram showing a detailed view of the select key frames set step of FIG. 2.

FIG. 4 is a more detailed view of the select key frames set step 214 of FIG. 2 according to a preferred embodiment of the present invention. A form coefficient matrix step 402 produces a coefficient matrix 403 responsive to the sparse sets of video frames 213. The coefficient matrix 403 quantifies the mutual dependency among the frames of the intermediate digital video 205 (FIG. 2). The form coefficient matrix step 402 can use any appropriate method known to those skilled in the art to determine the coefficient matrix 403. In a preferred embodiment of the present invention, each row of the coefficient matrix is comprised of γ for a different video frame of the intermediate digital video 205 stored in the sparse sets of video frames 213. In an equation form, the coefficient matrix 403 can be expressed as:

$$C = \begin{bmatrix} \gamma 1 \\ \gamma 2 \\ \vdots \\ \gamma N \end{bmatrix} \quad (7)$$

where C is the coefficient matrix 403.

A form video frames clusters step 404 uses the coefficient matrix 403 to produce a set of video frames clusters 405. The video frames clusters 405 contain at least one cluster of similar frames of the intermediate digital video 205 produced by the form video frames clusters step 404 by analyzing the coefficient matrix 403. The form video frames clusters step 404 can use any appropriate method known to those skilled in the art to determine the video frames clusters 405. In a preferred embodiment of the present invention, spectral clustering, a well-known clustering algorithm, is applied to the coefficient matrix 403 (C) to generate one or more clusters of similar frames of the intermediate digital video 205. More details about spectral clustering can be found in the article "A tutorial on spectral clustering" (Journal of Statistics and Computing, Vol. 17, pp. 395-416, 2007) by von Luxburg.

A select key frames step 406 selects at least one representative frame from each of the video frames clusters 405 to produce the key frames set 215. The key frames set 215 contains all the representative frames selected with the select key frames step 406. The select key frames step 406 can use any appropriate method known to those skilled in the art to select key frames from the video frames clusters 405. In a preferred embodiment of the present invention, the frame of the intermediate digital video 205 that is closest to the centroid of each of the video frames clusters 405 is selected as a key frame.

In another embodiment, an image quality metric is determined for each frame in a particular video frames cluster 405. The frame having the highest image quality metric value is then selected as a key frame. Examples of image quality attributes that can be evaluated to determine the image quality metric include detecting the presence of one or more faces in the video frame, estimating a noise level for the video frame, estimating a blur level for the video frame, and estimating a sharpness level for the video frame. Methods for determining these and other quality attributes are well-known in the art. For example, a method for detecting faces in a digital image is described by Romdhani et al. in the article "Computationally Efficient Face Detection" (Proc. $8^{th}$ International Conference on Computer Vision, pp. 695-700, 2001); a method for estimating noise in a digital image is described by Liu et al. in the article "Noise estimation from a single image" (IEEE Conference on Computer Vision and Pattern Recognition, pp. 901-908, 2006); and a method for estimating a sharpness level for a digital image is described by Ferzli et al. in the article "A no-reference objective image sharpness metric based on just-noticeable blur and probability summation" (IEEE International Conference on Image Processing, Vol. III, pp. 445-448, 2007). Other examples of image quality attributes that would be related to image quality include detecting rapid motion changes and classifying the video frames using semantic classification algorithms. When a plurality of quality attributes are determined for a given frame, they can be combined using any method known in the art to determine the overall visual quality score for the frame. For example, the image quality attributes can be combined using a weighted summation.

Figure 5:
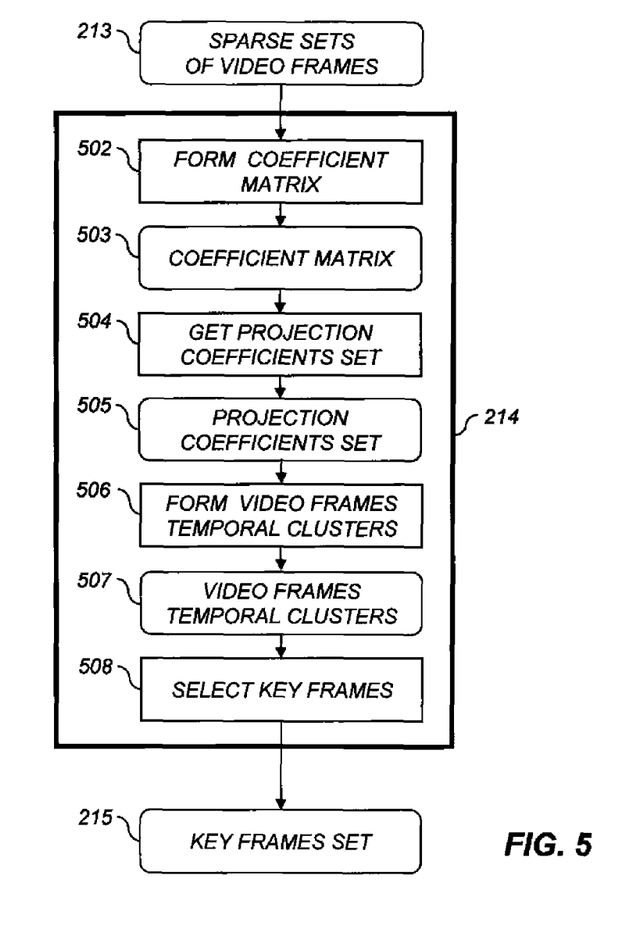
FIG. 5 is a block diagram showing a detailed view of the select key frames set step of FIG. 2 according to an alternate embodiment of the present invention.

FIG. 5 shows an alternate embodiment of the select key frames set step 214 from FIG. 2. A form coefficient matrix step 502 produces a coefficient matrix 503 responsive to the sparse sets of video frames 213. The form coefficient matrix step 502 can use any appropriate method known to those skilled in the art to determine the coefficient matrix 503. In a preferred embodiment of the present invention, the coefficient matrix 503 is the same as the coefficient matrix C given by Eq. (7).

A get projection coefficients set step 504 projects the coefficient matrix 503 row-wise (or column-wise) to produce a projection coefficients set 505. The get projection coefficients set 505 can use any method known to those skilled in the art to produce the projection coefficients set 505. In a preferred embodiment of the present invention, the get projection coefficients set step 504 projects the coefficient matrix 503 by summing up the values of each row of the coefficient matrix 503 and the projection coefficients are stored in the projection coefficients set 505. In an equation form, the projection coefficients set 505 can be expressed as:

$$P = [r_1, \ldots, r_N] \quad (8)$$

where P is the value of the projection coefficients set 505, and $r_i$ is the sum of the values of the $i^{th}$ row of the coefficient matrix 503 (i.e., the sum of the values of $\gamma_i$).

In another embodiment of the present invention, the get projection coefficients set step 504 produces the projection coefficients set 505 by adding the values of each column of the coefficient matrix 503.

The projection coefficients stored in the projection coefficients set 505 can be viewed as a temporal data as each projection coefficient is associated with a different frame of the intermediate digital video 205, and the frames of the intermediate digital video 205 are arranged temporally. As explained next, this observation is exploited to cluster the frames of the intermediate digital video 205.

A form video frames temporal clusters step 506 uses the projection coefficients set 505 to produce a set of video frames temporal clusters 507. A video frames temporal clusters step 506 determines a set of video frames temporal clusters 507 by analyzing the projection coefficients set 505. The video frames temporal clusters 507 contain at least one cluster of similar frames of the intermediate digital video 205. The form video frames temporal clusters step 506 can use any appropriate method known to those skilled in the art to determine the video frames temporal clusters 507. In a preferred embodiment of the present invention, the form video frames temporal clusters step 506 uses a temporal clustering algorithm as described by Liao in the article "Clustering of time series data—a survey" (Pattern Recognition, pp. 1857-1874, 2005) to analyze the projection coefficients set 505 to produce the video frames temporal clusters 507.

A select key frames step 508 selects at least one representative frame from the video frames temporal clusters 507 to produce the key frames set 215. The key frames set 215 contains all the representative frames selected with the select key frames step 508. The select key frames step 508 can use any appropriate method known to those skilled in the art to select key frames from the video frames temporal clusters 507. In a preferred embodiment of the present invention, the frame of the intermediate digital video 205 corresponding to the maximum projection coefficient value in each of the video frames temporal clusters 507 is selected as a key frame.

Figure 6:
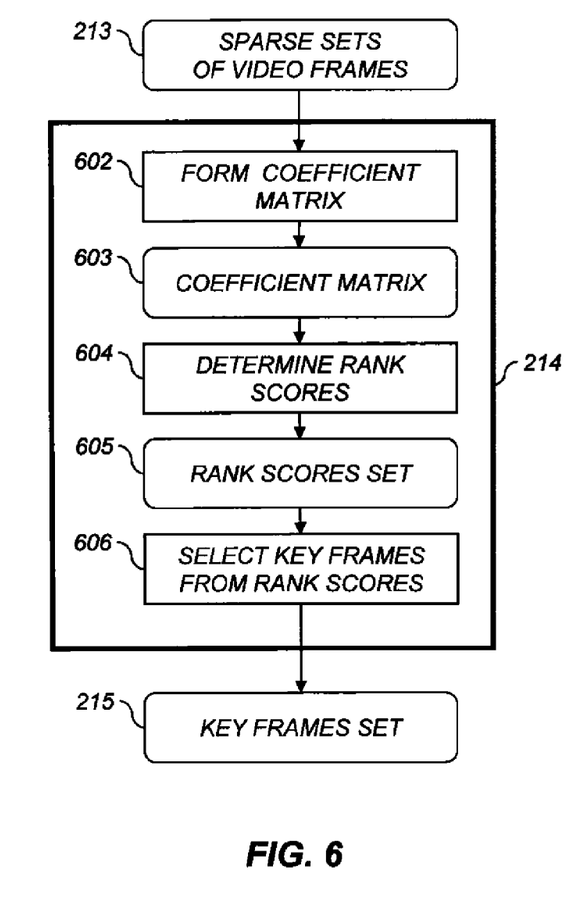
FIG. 6 is a block diagram showing a detailed view of the select key frames set step of FIG. 2 according to an alternate embodiment of the present invention.

FIG. 6 shows another alternate embodiment of the select key frames set step 214 from FIG. 2. A form coefficient matrix step 602 produces a coefficient matrix 603 responsive to the sparse sets of video frames 213. The form coefficient matrix step 602 can use any appropriate method known to those skilled in the art to determine the coefficient matrix 603. In a preferred embodiment of the present invention, the coefficient matrix 603 is the same as the coefficient matrix C given by Eq. (7).

A determine rank scores step 604 uses the coefficient matrix 603 to produce a rank scores set 605. The rank scores set 605 contains ranking scores for each frame of the intermediate digital video 205 (FIG. 2). Ranking scores stored in the rank scores set 605 indicate the relative importance of the frames of the intermediate digital video 205. The determine rank scores step 604 can use any appropriate method known to those skilled in the art to determine the rank scores set 605. In a preferred embodiment of the present invention, the determine rank scores step 604 uses a link analysis algorithm to analyze the coefficient matrix 603 to determine ranking scores for each frames of the intermediate digital video 205. Link analysis techniques have been extensively used for discovering the most informative nodes in a graph, and several link analysis algorithms have been described in the literature. In a preferred embodiment, the PageRank link analysis algorithm, discussed by Brin et al. in the article "The anatomy of a large-scale hypertextual web search engine" (Proc. International Conference on World Wide Web, pp. 107-117, 1998), is used to determine the ranking scores.

Figure 7:
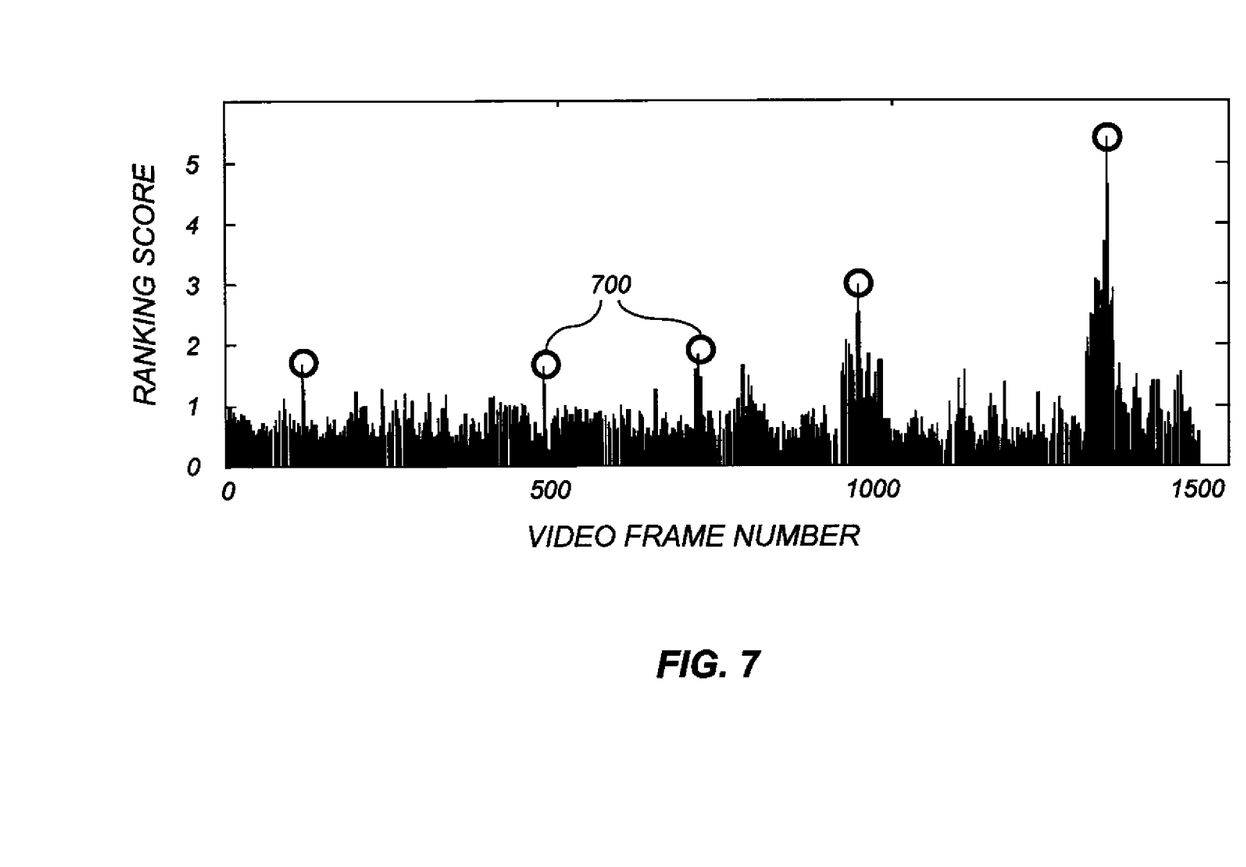
FIG. 7 shows an example of a ranking function plotting ranking score as a function of frame number.

A select key frames from rank scores step 606 produces the key frames set 215 responsive to the rank scores set 605. The select key frames from rank scores step 606 can use any appropriate method known to those skilled in the art to produce the key frames set 215. In one embodiment of the present invention, video frames with the highest ranking scores are selected for inclusion in the key frames set 215. In a preferred embodiment of the present invention, a ranking function expressing the ranking score as a function of a frame number of the intermediate digital video 205 is formed and the key frames set 215 is produced by selecting one or more frames of the intermediate digital video 205 corresponding to local extrema (e.g., local maxima) of the ranking function to be included in the key frames set 215. FIG. 7 shows an example graph of a ranking function. In this graph, the horizontal axis is the frame number of the intermediate digital video 205 and the vertical axis is the ranking score from the rank score set 605. The local maxima 700 corresponding to the frames selected for inclusion in the key frames set 215 are circled in the ranking function graph.

The key frames of the input digital video 203 stored in the key frames set 215 can further be used for various purposes. For example, the key frames can be used to index the video sequence, to create video thumbnails, to create a video summary, to extract still image files, to make a photo collage or to make prints.

It is to be understood that the exemplary embodiments disclosed herein are merely illustrative of the present invention and that many variations of the above-described embodiments can be devised by one skilled in the art without departing from the scope of the invention. It is therefore intended that all such variations be included within the scope of the following claims and their equivalents.

PARTS LIST

110 Data processing system
120 Peripheral system
130 user interface system
140 data storage system
202 receive input digital video step
203 input digital video
204 initialize intermediate digital video step
205 intermediate digital video
206 get homogeneous regions set step
207 homogeneous regions set
208 get basis function set step
209 basis function set
210 get video frame features set step
211 video frame features set
212 get sparse sets of video frames step
213 sparse sets of video frames
214 select key frames set step
215 key frames set
302 get feature level sparse combinations step
303 feature level sparse combinations
304 get frame level sparse combinations step
402 form coefficient matrix step
403 coefficient matrix
404 form video frames clusters step
405 video frames clusters
406 select key frames step
502 form coefficient matrix step
503 coefficient matrix
504 get projection coefficients set step
505 projection coefficients set
506 form video frames temporal clusters step
507 video frames temporal clusters
508 select key frames step
602 form coefficient matrix step
603 coefficient matrix 604 determine rank scores step
605 rank scores set
606 select key frames from rank scores step
700 local maxima

The invention claimed is:

1. A method for identifying a set of key frames from a video sequence including a time sequence of video frames, the method executed at least in part by a data processor, comprising:
   a) selecting a set of video frames from the video sequence;
   b) identifying a plurality of visually homogeneous regions from each of the selected video frames;
   c) defining a set of basis functions, wherein each basis function is associated with a different visually homogeneous region;
   d) determining a feature vector for each of the selected video frames;
   e) representing each of the determined feature vectors as a sparse combination of the basis functions;
   f) for each of the determined feature vectors, determining a sparse set of video frames that contain the visually homogeneous regions corresponding to the basis functions included in the corresponding sparse combination of the basis functions; and
   g) analyzing the sparse sets of video frames to identify the set of key frames
   wherein the set of key frames are selected by: forming a coefficient matrix, wherein each row of the coefficient matrix is comprised of a sparse vector identifying the sparse set of video frames for a different video frame in the set of video frames; using a clustering algorithm to analyze the coefficient matrix to define at least one cluster of similar video frames; and selecting at least one representative video frame from each cluster of similar video frames to be the key video frames.

2. The method of claim 1 wherein visually homogeneous regions are extracted using an image segmentation algorithm.

3. The method of claim 1 wherein the sparse combinations of the basis functions are determined by solving a first matrix equation:

$$y = A\alpha$$

for $\alpha$ using a sparse solver, where y is the feature vector for a particular frame, A is matrix formed using the set of basis functions, and $\alpha$ is a sparse vector of weighting coefficients for the basis functions.

4. The method of claim 3 wherein the sparse set of video frames that contain the visually homogeneous regions are determined by solving a second matrix equation:

$$\gamma = B\alpha$$

for $\gamma$ using a sparse solver, where B is a transformation matrix that relates the visually homogeneous regions to their corresponding video frames, and $\gamma$ is a sparse vector identifying the sparse set of video frames.

5. The method of claim 4 wherein $\alpha$ and $\gamma$ are determined by simultaneously solving the first and second matrix equations.

6. The method of claim 4 wherein a temporal constraint is imposed on the transformation matrix B.

7. The method of claim 1 wherein each sparse combination of the basis functions includes no more than 10% of the basis functions.

8. The method of claim 1 wherein each sparse set of video frames includes no more than 10% of the video frames.

9. The method of claim 1 wherein the selected set of video frames is all of the video frames in the video sequence.

10. The method of claim 1 wherein the selected set of video frames is a subset of the video frames in the video sequence.

11. The method of claim 1 wherein the process of determining the sparse set of video frames for a particular determined feature vector, preferentially selects video frames that are temporally near to the video frame corresponding to the particular determined feature vector.

12. The method of claim 1 wherein the feature vector for a particular selected video frame is determined responsive to region feature vectors determined for the visually homogeneous regions in the particular selected video frame.

13. The method of claim 12 wherein the feature vector for a particular selected video frame is determined by combining the region feature vectors determined for the visually homogeneous regions in the particular selected video frame.

14. The method of claim 1 wherein the feature vector for a video frame includes coefficients determined by applying a set of filters to the video frame.

15. The method of claim 1 wherein the set of filters are wavelet filters, Gabor filters, DCT filters or Fourier filters.

16. The method of claim 1 wherein the feature vector for a video frame includes a color histogram, a set of color statistics, an edge histogram, a GIST feature or a SIFT feature.

17. The method of claim 1 wherein the video frame that is closest to the centroid of each cluster of similar video frames is selected as a key video frame.

18. The method of claim 1 wherein an image quality metric is determined for each video frame in a cluster of similar video frames, and wherein the video frame having the highest image quality metric is selected as a key video frame.

19. The method of claim 1 further including using the key video frames to index the video sequence, to create video thumbnails, to create a video summary, to extract still image files, to make a photo collage or to make prints.

* * * * *